United States Patent [19]

Mojden et al.

[11] Patent Number: 5,524,947
[45] Date of Patent: Jun. 11, 1996

[54] SELF-CONTAINED PICK-AND-PLACE APPARATUS

[75] Inventors: Andrew E. Mojden, Hinsdale; Richard P. Hoinacki, Oak Lawn; Wayne Muhr, Downers Grove; Robert L. Reinhardt, Orland Park, all of Ill.

[73] Assignee: Fleetwood Systems, Inc., Romeoville, Ill.

[21] Appl. No.: 209,223

[22] Filed: Mar. 11, 1994

[51] Int. Cl.[6] .............................. B65G 59/00; B66C 1/42
[52] U.S. Cl. ........................ 294/116; 294/88; 414/790.2
[58] Field of Search ............................... 294/63.1, 81.5, 294/81.51, 81.6–81.62, 87.1, 88, 106, 115, 116; 414/416, 618, 751, 753, 739, 788.4, 790.2, 796.9

[56] References Cited

U.S. PATENT DOCUMENTS

| | | | |
|---|---|---|---|
| 1,049,839 | 1/1913 | Fraser | 294/81.61 X |
| 1,750,878 | 3/1930 | Coe | 294/81.61 X |
| 2,429,193 | 10/1947 | Pool et al. | 294/81.61 X |
| 3,155,416 | 11/1964 | Buchik et al. | 294/81.61 |
| 3,938,645 | 2/1976 | Farfaglia | 294/116 X |
| 3,987,905 | 10/1976 | Dechantsreiter | 294/81.61 X |
| 4,979,870 | 12/1990 | Mojden et al. | 414/788.4 |
| 5,119,617 | 6/1992 | Mojden et al. | 53/500 |

FOREIGN PATENT DOCUMENTS 837855  6/1981  U.S.S.R. ................. 294/116

*Primary Examiner*—Johnny D. Cherry
*Attorney, Agent, or Firm*—Trexler, Bushnell, Giangiorgi & Blackstone, Ltd.

[57] ABSTRACT

A self-contained pick-and-place apparatus for respectively engaging and releasing an elongate group of stacked articles such as an elongate stack of nested can ends comprises an elongate pivot shaft defining a longitudinal axis, a pair of elongated gripping members for surroundingly engaging the articles, and pivot arms coupled with the gripping members and mounted to the pivot shaft for bidirectional pivotal motion about the longitudinal axis for thereby moving the gripping members respectively toward and away from each other. The pivot arms are biased to pivot in a direction for moving the gripping members toward each other. One or more cams are supported by the pivot shaft for movement between a pivot arm open position and a pivot arm closed position. Cam followers are mounted to the pivot arms and follow the cams for overcoming the biasing force and pivoting the pivot arms in a direction for moving the gripping members away from each other when the cams are in the pivot arm open position and for permitting the biasing of the pivot arms in a direction for moving the gripping members toward each other when the cams are in the pivot arm closed position. An actuator is supported by the pivot shaft for moving the cams between the pivot arm open position and the pivot arm closed position.

24 Claims, 3 Drawing Sheets

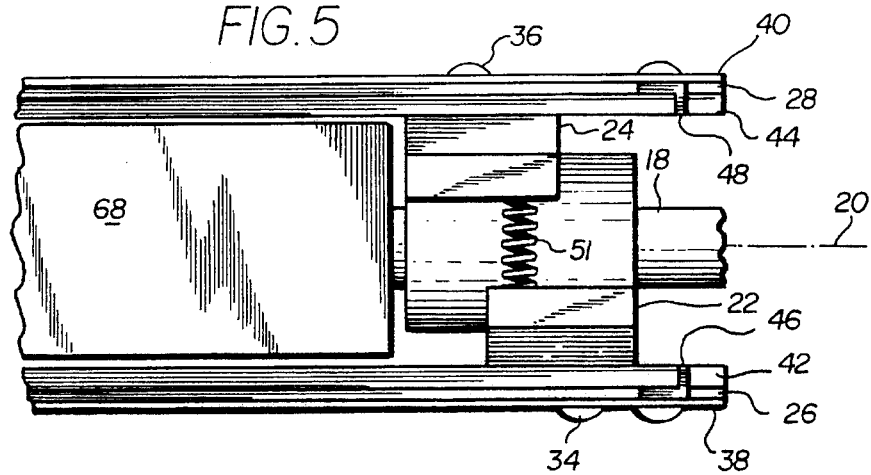
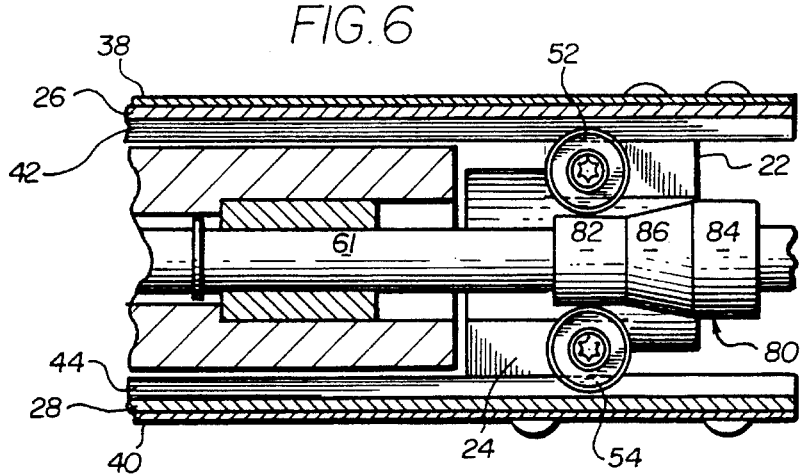
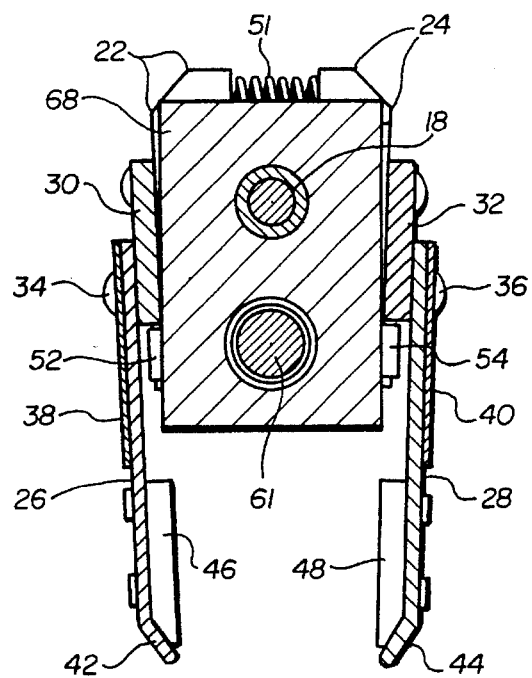

SELF-CONTAINED PICK-AND-PLACE APPARATUS

BACKGROUND OF THE INVENTION

This invention is directed generally to article handling equipment for handling articles such as can ends or the like, and more particularly to a novel and improved self-contained pick-and-place apparatus for selectively transferring stacks of articles such as stacks of nested can ends from one location to another location.

In article handling applications, such as the handling of can ends, relatively large numbers of such articles must be transferred between various stations such as in fabrication, packaging and other utilization apparatus at a relatively high rate. In some instances, articles such as can ends are handled in groups of a predetermined number stacked in groups of a predetermined number which are in an upright nested condition. In many instances, it is desired to handle such groups or "sticks" of can ends as they are often called, as a group, for example in moving the stick between generally parallel and spaced apart article-carrying lanes of associated article handling apparatus.

Pick-and-place devices of various designs have been heretofore utilized in accomplishing such transfers of groups of sticks of can ends or similar groups of stacked articles. In one application, the articles are moved alternatively into and out of storage trays, for example as shown in U.S. Pat. No. 4,979,870 to Mojden et al. issued Dec. 25, 1990, which is commonly owned herewith and also in application Ser. No. 07/984,181, filed Nov. 20, 1992 entitled AUTOMATIC LOADING, UNLOADING AND COMPENSATING SYSTEM now U.S. Pat. No. 5,372,473 and Ser. No. 08/011,381, filed Jan. 29, 1993 entitled INFEED APPARATUS FOR ARTICLE HANDLING SYSTEM now U.S. Pat. No. 5,441,382, which also are commonly owned with this application. In another application, a single pick-and-place device is shown for transferring can ends between lanes of a multiple lane infeed for a can end packaging apparatus, as shown in U.S. Pat. No. 5,119,617 to Mojden et al. issued Jun. 9, 1992 which is also commonly owned herewith.

In some of the foregoing patents and applications, multiple pick-and-place devices are provided for servicing multiple lanes of an article handling system. As such, in some instances a number of different pick-and-place devices may be movable relative to the lanes, such that more than one pick-and-place device might service a given lane at any time. In the multiple lane bagging apparatus, a single pick-and-place device is shown servicing multiple lanes of the apparatus. In some instances, actuating means or mechanisms for opening and closing the pick-and-place devices relative to each lane have been associated with, and physically mounted adjacent, the lanes themselves, such that the actuating device may serve to open and close the jaws or article gripping means of each of a plurality of different pick-and-place devices as the same service the associated lane.

The present invention provides a novel and improved pick-and-place device which is of improved design and construction for improving even further on the devices shown in the foregoing patents and applications.

The pick-and-place device of the invention includes a novel and improved on-board system of opening and closing the article gripping members of the device. In the illustrated embodiment of the invention, the article gripping means further includes on-board lifting and lowering means for respectively lifting and lowering the article gripping members relative to the articles in lanes and/or article storage trays to be serviced by the device. This on-board lifting and lowering mechanism together with the opening and closing system are such that the pick-and-place device of the invention may be advantageously provided in a modular form to be mounted to a suitable mobile frame for movement of the device laterally among one or more lanes and/or multiple positions in a storage tray to be serviced thereby.

The present invention also presents a number of improvements in the construction of the pick-and-place device as will be more fully detailed hereinbelow. Among these improvements is a novel, central axial pivot shaft to which article gripping members are pivotally mounted. Also, the invention provides a novel system of an axially extending cam shaft mounting one or more cam members and responsive cam followers for pivoting the article gripping members between open and closed conditions for respectively releasing and retaining articles.

OBJECTS AND SUMMARY OF THE INVENTION

Accordingly, it is a general object of this invention to provide a novel and improved self-contained pick-and-place apparatus for handling groups of stacked articles such as nested can ends.

Briefly and in accordance with the foregoing object, a self-contained pick-and-place apparatus is provided for respectively surroundingly grippingly engaging and releasing an elongate group of stacked articles such as an elongate stack of nested can ends, said apparatus comprising: an elongate pivot shaft defining a longitudinal axis; a pair of elongated gripping members for surroundingly engaging said articles; pivot arm means coupled with said gripping members and mounted to said pivot shaft for bidirectional pivotal motion about said longitudinal axis for thereby moving said gripping members respectively toward and away from each other; first biasing means for biasing said pivot arms to pivot in a direction for moving said gripping members toward each other; cam means supported by said pivot shaft for movement between a pivot arm open position and a pivot arm closed position; cam follower means mounted to said pivot arms and responsive to said cam means for overcoming said first biasing means and for pivoting said pivot arms in a direction for moving said gripping members away from each other when said cam means is in pivot arm open position and for permitting said biasing means to move said pivot arms in a direction for moving said gripping members toward each other when said cam means is in said pivot arm closed position, and actuator means supported by said pivot shaft for moving said cam means between said pivot arm open position and said pivot arm closed position.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements, and in which:

FIG. 5 is a view taken generally along the line 5—5 of FIG. 2;

FIG. 6 is a sectional view taken generally along the line 6—6 of FIG. 2; and

FIG. 7 is a sectional view taken generally along the line 7—7 of FIG. 2.

DETAILED DESCRIPTION OF THE ILLUSTRATED EMBODIMENT

Figure 1:
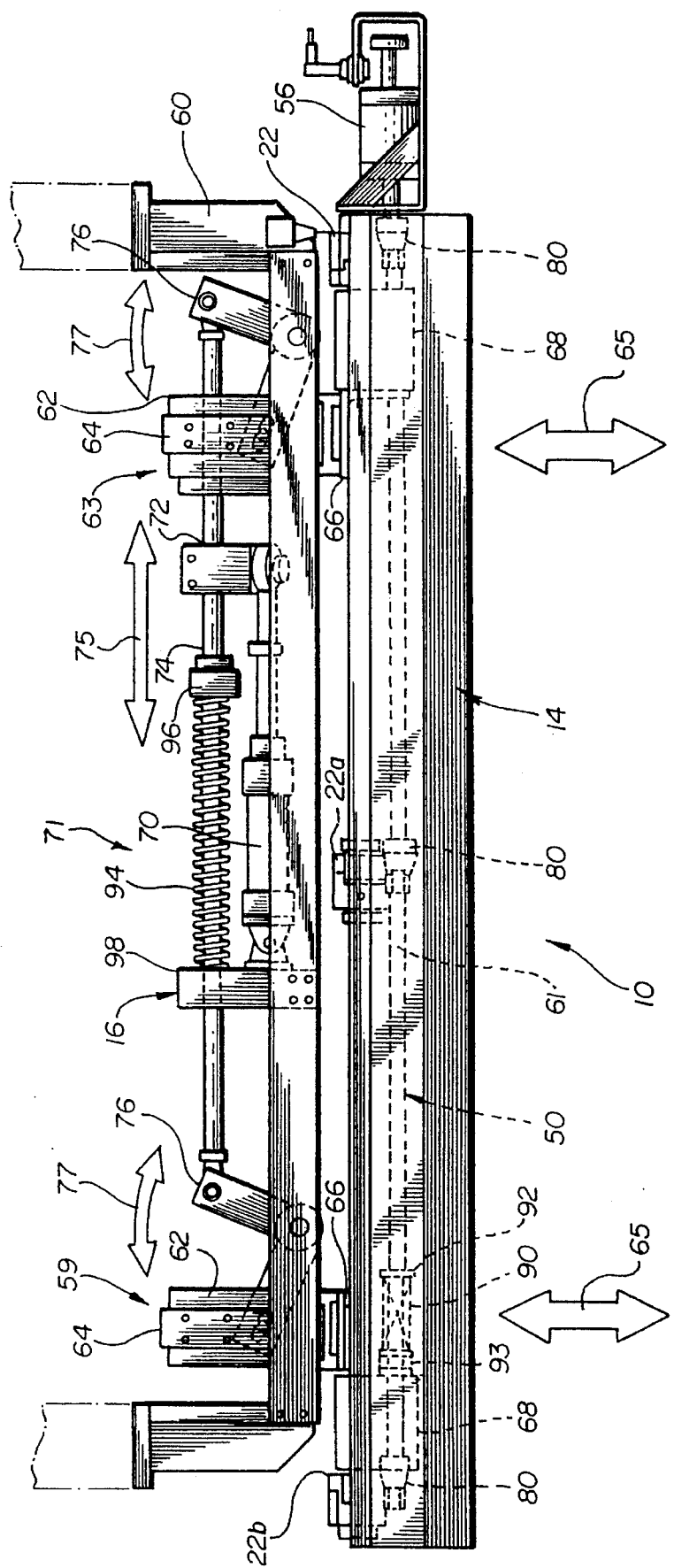
FIG. 1 is a side elevation of a self-contained pick-and-place apparatus in accordance with the invention.
Figure 2:
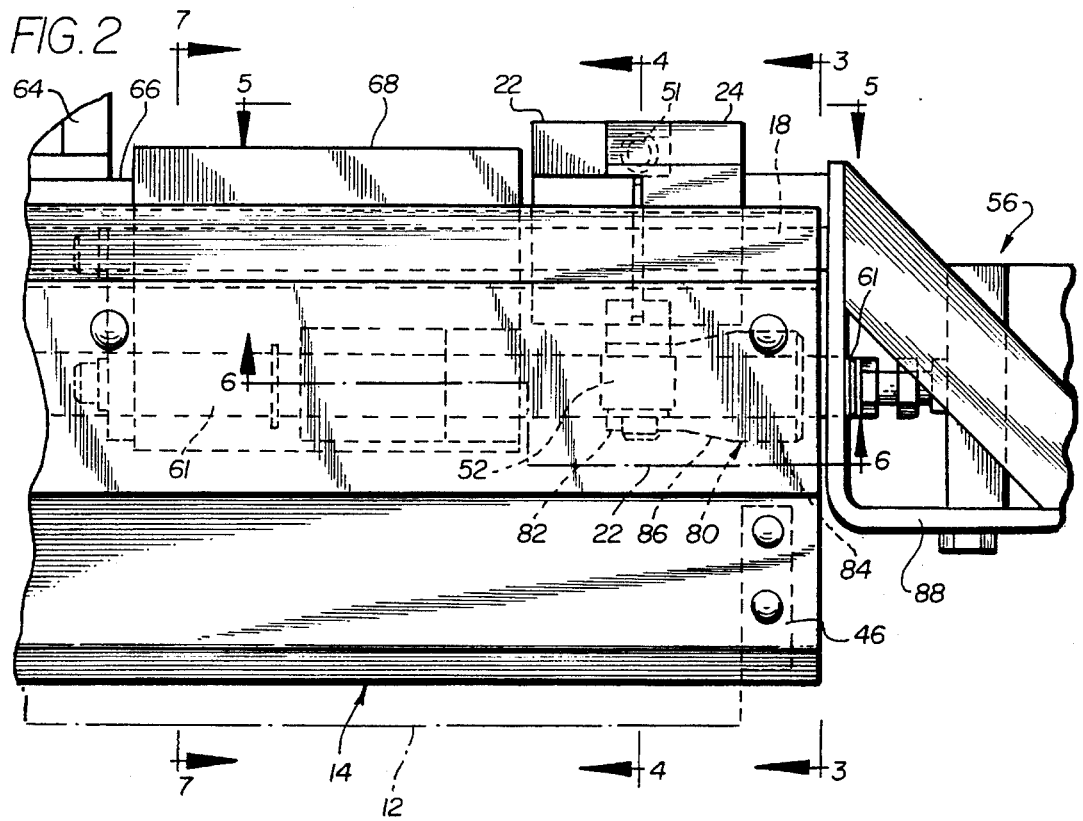
FIG. 2 is an enlarged side elevation of a portion of the apparatus of FIG. 1.

Referring now to the drawings, and initially to FIGS. 1 and 2, a self-contained pick-and-place apparatus for respectively surroundingly grippingly engaging and releasing an elongate group of stacked articles such as an elongate stack of nested can ends is designated generally by the reference numeral 10. An elongate stack of nested can ends or similar articles is indicated in phantom line in FIG. 2 at reference numeral 12. Such a nested group of can ends is often referred to in the art as a "stick". Generally speaking, the pick-and-place apparatus or device 10 comprises two major subassemblies, a first of which comprises a gripping and releasing subassembly 14 and a second of which comprises a lifting and lowering subassembly 16. The former or gripping and releasing subassembly 14 is configured and adapted for alternatively surroundingly gripping or engaging and releasing the stick or group of articles 12. The lifting and lowering subassembly 16 is configured and adapted for respectively lifting and lowering the gripping and releasing subassembly 14 relative to a lane or trough, a storage tray, or other similar structure, from which or to which a group of articles is to be transferred by the article gripping and releasing subassembly 14.

Referring now also to the remaining figures of drawings, the article gripping and releasing subassembly 14 includes an elongate pivot shaft 18 which defines a longitudinal axis 20. In the illustrated embodiment, this elongate pivot shaft 18 essentially defines a central structural member or "backbone" of the gripping and releasing subassembly 14. Pivot arm means in the form of a pair of generally symmetrically formed and disposed pivot arms 22 and 24 are mounted to the pivot shaft 18 for bidirectional pivotal motion about the longitudinal axis 20. These pivot arms 22 and 24 in turn mount a pair of elongate gripping members or article grippers 26, 28 which are located and configured for surroundingly engaging the articles or stack 12.

Figure 3:
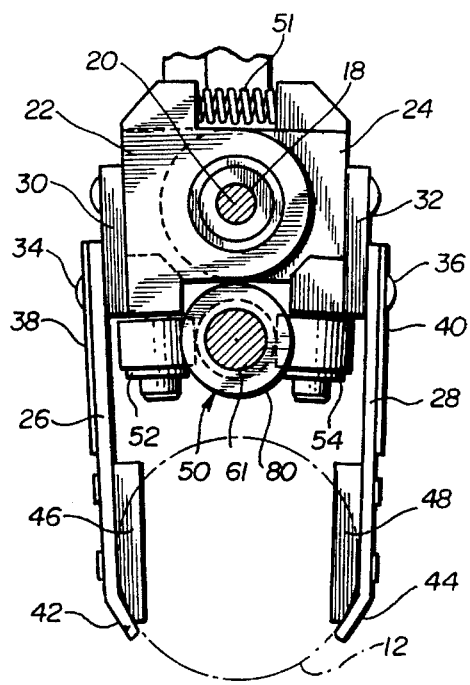
FIG. 3 is a view taken generally along the line 3—3 of FIG. 2.
Figure 4:
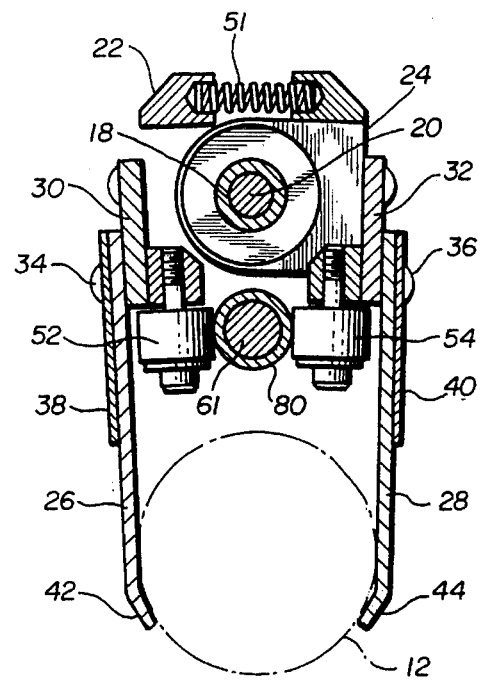
FIG. 4 is a sectional view taken generally along the line 4—4 of FIG. 2.

A first biasing means in the form of a compression spring 51 is interposed between upwardly extending portions of the respective pivot arms 22, 24 for biasing the pivot arms to pivot in the direction for moving the gripping members 26, 28 toward each other for grippingly engaging the articles or stick 12 as shown in FIGS. 3 and 4.

In the illustrated embodiment, three such pairs of pivot arms 22, 24 and associated springs 51 are mounted at spaced intervals along the length of the pivot shaft 18 and are similarly coupled to the gripping members 26, 28 at spaced intervals for supporting and pivoting the gripping members respectively toward and away from each other as the pivot arms pivot relative to the pivot shaft 18. In FIG. 1, one each of the second and third pair of pivot arms are indicated generally by reference numerals 22a and 22b. In the illustrated embodiment, the pivot arms 22, 24 mount elongate relatively rigid (preferably steel) plates 30, 32 to which the gripping members 26, 28 are in turn mounted by suitable fasteners 34, 36 or the like. As illustrated herein, elongate stiffening members, preferably in the form of metallic or steel plates 38, 40 further stiffen an upper portion of the gripping members 26, 28 and are coupled via the plates 30 and 32 to the arms 22 and 24.

The gripping members 26, 28 are preferably elongate, generally flat, rectangular members formed from a relatively rigid plastics material, which in the illustrated embodiment is preferably transparent, such that an operator can observe the gripping and releasing of the stick 12 or other articles thereby. In order to facilitate the gripping and lifting of the articles or stick 12, lower-most ends of the gripping members 26, 28 are formed with mutually inwardly curved or angled surfaces 42, 44. In addition, for retaining opposite axial ends of the group of articles or stick 12 within the gripping members or assemblies 26, 28, additional end holding members or pieces 46, 48 are preferably affixed near the opposite axial ends of the respective gripping members or plates 26, 28.

In accordance with another feature of the invention, a cam means or cam assembly 50 is operatively supported by the pivot shaft 18 for movement between a gripper open position (not shown) and a gripper closed position (as shown in FIGS. 3 and 4). Cooperatively, cam follower means which in the illustrated embodiment takes the form of a pair of cam follower roller members 52, 54 are respectively mounted to the pivot arms 22, 24. These cam followers 52, 54 follow or are responsive to the cam means 50 for pivotally moving the pivot arms 22, 24 in a direction for moving the gripping members 26 and 28 away from each other when the cam means 50 is in the gripper open position, thereby overcoming the first biasing means 51. The cam follower rollers 52, 54 are also responsive to or follow the cam means 50 when the cam means is in the gripper closed position for permitting the biasing means or spring 51 to move the pivot arms 22 and 24 back toward each other to the position illustrated in FIGS. 3 and 4.

First actuator or cam actuator means or assembly 56 is supported by the pivot shaft 18 for moving the cam means or assembly 50 via a cam shaft 61 between the gripper open position and the gripper closed position. Preferably, this first actuator 56 is a piston and cylinder and moves the cam means or assembly in a manner to be described more fully presently.

Turning again to the operation of the cam means or assembly 50, it will be noted that this assembly comprises an elongate cam shaft 61, which is mounted to or suspended from the pivot shaft 18 by means of respective bearing block members 68. Preferably, two such members 68 are located near opposite axial ends of the gripping assembly 14. It should be noted at this point that a set of the cam follower means or rollers 52, 54 are provided with respect to each of the three pairs of pivot arms 22, 24 which are spaced along the length of the gripping assembly 14 as mentioned hereinabove.

At least one, and in the illustrated embodiment, three substantially identical cam members 80 are mounted to the cam shaft 61 and spaced along the length thereof for respectively operatively engaging the respective cam follower rollers 52, 54 associated with each of the three sets of pivot arms 22, 24. In the illustrated embodiment, each cam member 80 has a cam surface defined by first and second axially spaced apart generally cylindrical portions 82, 84 and a generally frustoconical portion 86 intermediate and joining these two cylindrical portions 82, 84.

In operation, as the cam follower rollers 52, 54 follow the cam 80 from the smaller diameter portion 82 thereof to the larger diameter portion 84, the pivot arms 22 and 24 will be pivoted respectively oppositely outwardly to achieve opening of the gripping members 26, 28 relatively to articles or a stick 12, overcoming the biasing force of the springs 51. Conversely, as the cam follower rollers 52, 54 follow the cam surface 80 from the larger diameter surface 84 to the smaller diameter surface 82, the pivot arms will return under the influence of the springs 51 to their relatively closed condition as illustrated in FIGS. 3 and 4 for grippingly engaging articles or a stick 12 therebetween.

The lifting and lowering subassembly 16 is operatively coupled with the pivot shaft 18 and is configured for bidirectionally moving the pivot shaft 18 and hence the entire gripping assembly 14 in a direction generally perpendicular to the longitudinal axis 20 of the pivot shaft 18. In the illustrated embodiment, the lifting and lowering subassembly 16 includes a frame member or portion 60 to which is mounted a first or fixed member 62 of each of a pair of substantially identical and spaced apart bearing block assemblies 59, 63, each of which also has a relatively slidable member 64. The relatively slidable bearing block member 64 is mounted for sliding bidirectionally in a direction generally perpendicular to the axis 20 of the pivot shaft 18 (see arrows 65).

The relatively slidable member 64 of each bearing block assembly is operatively coupled to the pivot shaft 18. In the illustrated embodiment, this coupling is had by way of respective brackets 66 and bearing blocks 68. As previously noted, each of the bearing blocks 68 has parallel and spaced through bores for receiving respectively the pivot shaft 18 and also the shaft portion 61 of the cam assembly 50.

Second actuator or lifting and lowering actuator means or assembly 71 includes a piston and cylinder 70 having one end fixedly mounted to the frame 60 and another end coupled to a linkage member 72 which is in turn coupled for bidirectionally moving an elongate shaft 74 as indicated by arrows 75. Opposite ends of shaft 74 are in turn coupled to one end of each of a pair or generally L-shaped crank arm members 76, each of which is pivotally coupled to the frame 60 at its midpoint, so as to pivot relative to the frame 60 (see arrows 77). Opposite ends of each of the crank arm members 76 are coupled to the movable members 64 of the bearing block assemblies to thereby move these members in a vertical direction in response to horizontal motion of the shaft 74. The linkage 72, shaft 74 and crank arms 76 collectively form a linkage means or assembly operatively coupling the piston and cylinder 70 to the movable slidable members 64 of respective bearing block assemblies. Thus, the lifting and lowering assembly 16 is also provided as an on-board or self-contained part of the pick-and-place apparatus or device 10 of the invention.

This movement of the cam surface 80 relative to the cam follower rollers 52 and 54 is accomplished by the cam actuator means or assembly 56 which as mentioned above comprises a piston and cylinder. This piston and cylinder 56 is mounted to a bracket 88 which is in turn mounted to or suspended from an end portion of the pivot axis 18. The piston portion of the piston and cylinder actuator 56 is coupled with an axial end part of the cam shaft 61.

Preferably, both the cam shaft 61 and the shaft member 74 of the lift and lower subassembly 16 are provided with failsafe positioning means. That is, in the event of loss of power to either of pistons and cylinders 56 or 70, the shafts 61 and 74 will each assume a predetermined or "failsafe" position. In the case of the cam shaft 61, the failsafe position is with the arms 22, 24 in the closed position. This will result in the gripping members 26, 28 also being in a closed position to retain articles or a stick 12 (if any) therewithin. This is accomplished by the provision of a compression spring 90 which surrounds the cam shaft 61 and applies pressure between a fixed collar 92 coupled to the cam shaft 61 and an additional collar or spacer 93 which is interposed between an outer surface of the bearing block 68 and one end of the compression spring 90. This causes the pivot shaft to move in a direction for placing the smaller diameter cam surface 82 between respective pairs of cam follower rollers 52, 54. This in turn permits respective pairs of pivot arms 22, 24 to be biased to the closed position by the associated compression springs 51.

In the case of the shaft 74, a similar compression spring 94 is mounted between a collar 96 affixed to the shaft 74 and a facing surface of a bracket 98 which is bored to freely receive the shaft 74 therethrough and also mounts the fixed end of the cylinder portion of the piston and cylinder 70 to the lift and lower frame 60.

Accordingly, in operation the piston and cylinder 56 drives the cam shaft 61 against the action of the biasing spring 90. Similarly, the piston and cylinder 70 drives the shaft 74 in opposition to the biasing force of the spring 94. In the case of the lift and lower assembly 16, the biasing spring 94 is arranged such that the shaft 74 is biased thereby in a direction for lifting the gripping subassembly 14 in an upward direction as viewed in FIG. 1.

While a particular embodiment of the invention has been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The Invention is claimed as follows:

1. An apparatus for respectively engaging and releasing an elongate group of stacked articles, said apparatus comprising: an elongate pivot shaft defining a longitudinal axis; a pair of elongated article grippers for engaging said articles; pivot arms coupled with said article grippers and mounted to said pivot shaft for pivotal motion about said longitudinal axis for thereby moving at least one of said article grippers for engaging said elongate group of stacked articles; a first biasing portion for biasing said pivot arms to pivot in a direction for moving at least one of said article grippers; a cam supported by said pivot shaft for movement parallel to said longitudinal axis between a gripper open position and a gripper closed position; a cam follower mounted to said pivot arms and responsive to axial movement of said cam for overcoming said first biasing portion and for pivoting at least one of said pivot arms in a direction for moving said article grippers to an open position when said cam is in said gripper open position and for permitting said first biasing portion to move said pivot arms in a direction for moving at least one of said article grippers to a closed position when said cam is in said gripper closed position, and a first actuator supported by said pivot shaft for moving said cam between said gripper open position and said gripper closed position.

2. Apparatus according to claim 1 and further including a lifting and lowering device coupled to said pivot shaft for bidirectionally moving said pivot shaft in a direction generally perpendicular to said longitudinal axis.

3. Apparatus according to claim 2, said lifting and lowering device comprising a bearing block assembly having first and second relatively slidable members, said first member being coupled to said pivot shaft, said second member being retained in a fixed position, said first member being slidable along said second member, and a second actuator coupled to said first member for moving said first member generally perpendicular to said longitudinal axis.

4. Apparatus according to claim 3, further comprising said second actuator having a piston and cylinder and said bear block assembly having a linkage coupled to said piston and cylinder and to said first member of said bearing block assembly.

5. Apparatus according to claim 4 further including a frame, said second member of said bearing block assembly being fixedly mounted to said frame and said piston and cylinder and said linkage being attached to said frame.

6. Apparatus according to claim 4, further comprising a linkage biasing device coupled with said linkage for biasing said first member in a first direction perpendicular to said pivot shaft, said second actuator being coupled to said linkage for overcoming said linkage biasing device and driving said first member in in a second direction perpendicular to said pivot shaft.

7. Apparatus according to claim 6, further comprising a frame, and wherein said second member, of said bearing block assembly and said second actuator are attached to said frame and said linkage is rotatably attached to said frame.

8. Apparatus according to claim 7, said linkage biasing device biasing said linkage in a direction for driving said first member in a direction for lifting said pivot shaft relative to said frame.

9. Apparatus according to claim 1, said cam comprising an elongate cam shaft supported by said pivot shaft, said elongate cam shaft defining a central axis parallel to said longitudinal axis, said cam shaft being movable along said central axis, and at least one cam body carried by said cam shaft having a cam surface defining a first outer diameter and a second outer diameter greater than said first outer diameter and a surface intermediate said first and second outer diameters.

10. Apparatus according to claim 9 wherein said cam follower comprises cam follower elements mounted respectively to said pivot arms and engaged with said cam surface.

11. Apparatus according to claim 10 wherein said cam follower elements comprise rollers.

12. Apparatus according to claim 9, said first actuator comprising a piston and cylinder coupled to said cam shaft for driving said cam shaft against a spring coupled to said cam shaft.

13. Apparatus according to claim 12, said first actuator means further comprising a second biasing portion coupled to said cam shaft for biasing said cam shaft toward one of said gripper closed and said gripper open positions, said piston and cylinder being coupled to said cam shaft for overcoming said second biasing portion and driving said cam shaft toward the other of said gripper open and said pivot arm closed positions.

14. Apparatus according to claim 13, said linkage biasing device biasing said cam shaft toward said gripper closed position.

15. Apparatus according to claim 1, said article grippers comprising generally flat elongate rectilinear members, each formed of a single piece of relatively rigid material having an upper edge coupled with said pivot arms and a lower edge being angled mutually inwardly toward each other for engaging articles therebetween.

16. Apparatus according to claim 15, said article grippers further include inwardly projecting end stops at axially opposite ends thereof for limiting axial movement of articles held therebetween.

17. Apparatus according to claim 15 wherein said article grippers are formed of a plastics material.

18. An apparatus for engaging, lifting, placing and releasing an elongated group of stacked articles, said apparatus comprising:

a frame;

a lifter assembly attached to said frame;

an elongated pivot shaft being suspended from said lifter assembly and defining a longitudinal axis;

a cam assembly coupled to said pivot shaft, a cam shaft of said cam assembly being axially displaceable generally parallel to said longitudinal axis;

a gripper assembly attached to and suspended from said elongated pivot shaft, said gripper assembly including a pair of elongated article grippers, said cam shaft being coupled to said gripper assembly for moving said grippers to engage and release a group of stacked articles; and whereby said lifter assembly lifts and lowers said elongated pivot shaft relative to said frame for lifting and placing said gripper assembly.

19. An apparatus as recited in claim 18, said cam assembly further comprising:

said elongated cam shaft, a cam body and a cam follower;

one of said cam body and said cam follower being carried on said elongated cam shaft and the other of said cam body and said cam follower being carried on said pivot arm;

a gripper actuator attached to said cam assembly for selectively operating said cam assembly; and said cam shaft being suspended from said lifting assembly and connected to said gripper actuator, operation of said gripper actuator generally axially displacing said cam shaft for relative movement of said cam body and said cam follower such that said cam assembly drives said article grippers into at least an article gripper open position.

20. An apparatus as recited in claim 19, further comprising a second biasing portion associated with said cam shaft for biasing said cam shaft in a direction generally opposite the direction of movement produced by said gripper actuator.

21. An apparatus as recited in claim 18, said lifter actuator comprising a moving mechanism and a linkage connected to said moving mechanism, said moving mechanism being operatively attached to said frame and said linkage being operatively connected to said moving mechanism and said slidable portion, whereby operation of said moving mechanism moves said linkage to displace said slidable portion relative to said fixed portion.

22. An apparatus as recited in claim 21, further comprising a linkage biasing device attached to said linkage and said moving mechanism for biasing said linkage into a gripper lifting position.

23. An apparatus for engaging, lifting, placing and releasing an elongated group of stacked articles, said apparatus comprising:

a frame;

a lifter assembly attached to said frame;

an elongated pivot shaft being suspended from said lifter assembly and defining a longitudinal axis;

a gripper assembly operatively attached to said elongated pivot shaft for engaging and releasing a group of stacked articles;

pivot arms operatively attached to said elongated pivot shaft, said pivot arms being pivotable relative to said pivot shaft about said longitudinal axis;

a pair of oppositely positioned article grippers attached to said pivot arms, said grippers generally extending parallel to said longitudinal axis of said pivot shaft a dimension sufficient to contact an outside surface of a corresponding elongated group of articles, said grippers being movable on said pivot arms between a gripper closed position and a gripper open position for engaging and releasing a stacked group of articles, respectively;

a first biasing portion operatively attached to said pivot arms for biasing said pivot arms to move said article grippers into a normally gripper closed position;

a cam assembly partially suspended from said lifter assembly and partially carried on said pivot arms;

a gripper actuator attached to said cam assembly for selectively operating said cam assembly, whereby said gripper actuator operates said cam assembly to pivot said pivot arms about said pivot shaft for closing and opening said article grippers to engage and release said stacked group of articles, respectively; and whereby said lifter assembly lifts and lowers said elongated pivot shaft relative to said frame for lifting and placing said gripper assembly.

24. An apparatus for engaging, lifting, placing and releasing an elongated group of stacked articles, said apparatus including a frame, a lifter assembly attached to said frame, said lifter assembly comprising:

a fixed portion attached to said frame;

a slidable portion coupled with said fixed portion for facilitating movement of said slidable portion relative to said fixed portion generally perpendicular to said longitudinal axis;

a crank cam member attached to said slidable portion;

a lifter actuator attached to said crank arm member for moving said slidable portion between a gripper lifting position and a gripper placing position;

an elongated pivot shaft being suspended from said lifter assembly and defining a longitudinal axis;

a gripper assembly operatively attached to said elongated pivot shaft for engaging and releasing a group of stacked articles; and whereby said lifter assembly lifts and lowers said elongated pivot shaft relative to said frame for lifting and placing said gripper assembly.

\* \* \* \* \*